United States Patent

Harth et al.

Patent Number: 5,193,085
Date of Patent: Mar. 9, 1993

[54] MAGNETO-OPTICAL RECORDING MEDIUM WITH EXCHANGE-COUPLED REPRODUCING LAYER CONTAINING PLATINUM

[75] Inventors: Klaus Harth, Altleiningen; Hartmut Hibst, Schriesheim, both of Fed. Rep. of Germany

[73] Assignee: BASF Aktiengesellschaft, Ludwigshafen, Fed. Rep. of Germany

[21] Appl. No.: 761,131

[22] Filed: Sep. 17, 1991

[30] Foreign Application Priority Data

Sep. 21, 1990 [DE] Fed. Rep. of Germany ....... 4029874

[51] Int. Cl.$^5$ .............................................. G11B 13/04
[52] U.S. Cl. ................................................ 369/275.2
[58] Field of Search ................. 369/275.1, 275.5, 288; 428/694, 900

[56] References Cited

U.S. PATENT DOCUMENTS

| | | | |
|---|---|---|---|
| 4,628,485 | 12/1986 | Tanaka et al. | 365/122 |
| 4,645,722 | 2/1987 | Katayama et al. | 428/694 |
| 4,693,943 | 9/1987 | Kishi et al. | 428/694 |
| 4,753,853 | 6/1988 | Sato et al. | 428/694 |
| 5,030,512 | 7/1991 | Kato et al. | 428/694 |

FOREIGN PATENT DOCUMENTS

| | | |
|---|---|---|
| 0051296 | 6/1985 | European Pat. Off. |
| 0229292 | 7/1987 | European Pat. Off. |
| 0302393 | 2/1989 | European Pat. Off. |
| 0330394 | 8/1989 | European Pat. Off. |
| 0364196 | 4/1990 | European Pat. Off. |
| 0364212 | 4/1990 | European Pat. Off. |

Primary Examiner—Hoa T. Nguyen
Attorney, Agent, or Firm—Herbert B. Keil

[57] ABSTRACT

In a magnetooptical computer disk having one or more optically transparent dimensionally stable substrates and one or more double layer systems consisting of two exchange-coupled magnetic layers which consist of alloys of rare earth metals with transition metals and have vertical magnetic anisotropy, the first magnetic layer adjacent to the substrate has a composition corresponding to the formula I $$RE_xTM_{100-x-y-a}Pt_yA_a \qquad I$$

and the second magnetic layer, which is arranged on that side of the first magnetic layer which faces away from the substrate, has a composition corresponding to the formula II $$RE_uTM_{100-u-b}B_b \qquad II$$

where
RE is one or more elements from the group consisting of Gd, Tb, Dy and Ho,
TM is one or more elements from the group consisting of Fe and Co,
A and B independently of one another are elements from the group consisting of Cr, Nb, Ta, Al, Si, Ni and Mo,
and
$5 \leq x \leq 30$,
$0.5 \leq y \leq 20$,
$15 \leq u \leq 30$,
$0 \leq a \leq 25$ and
$0.5 \leq b \leq 25$.

7 Claims, No Drawings

MAGNETO-OPTICAL RECORDING MEDIUM WITH EXCHANGE-COUPLED REPRODUCING LAYER CONTAINING PLATINUM

BACKGROUND OF THE INVENTION

1. Field of the Invention

The present invention relates to a magnetooptical computer disk having one or more optically transparent dimensionally stable substrates and one or more double layer systems consisting of two exchange-coupled magnetic layers which consist of alloys of rare earth metals with transition metals and have vertical magnetic anisotropy. The present invention relates in particular to magnetooptical computer disks having a Pt-containing reproducing layer.

2. Description of the Related Art

Known magnetooptical recording layers for recording and reading information are, for example, monocrystalline garnet layers (e.g. yttrium iron garnet), polycrystalline layers of MnBi or amorphous layers of alloys of lanthanides (RE) and transition metals (TM), abbreviated below to (RE-TM).

Recently, the amorphous (RE-TM) layers have been preferred since these recording layers can be produced over large areas by sputtering methods or vapor deposition methods, and the recorded signals can be read with a high signal-to-noise ratio. Many amorphous (RE-TM). alloys, for example Tb-Fe, Tb-Fe-Co, Gd-Tb-Fe-Co, Dy-Fe-Co, Nd-Tb-Fe-Co or Nd-Dy-Fe-Co, additionally have the advantage that the ferrimagnetic coupling of the RE and TM atoms results in a high coercive force in a direction at right angles to the plane of the layer.

These known magnetooptical computer disks are used for recording or writing data with the aid of laser beams (for example pulse-modulated), which are focused on the magnetooptical recording layers and strike them at right angles.

During recording or writing of data, an external auxiliary magnetic field is applied to the magnetooptical computer disks, the field lines of which field are oriented at right angles to the surface of the magnetooptical recording layers. The direction of the external magnetic field is opposite to the direction of magnetization of the magnetooptical recording layer. In addition, the magnetooptical recording layers may have a correspondingly oriented immanent (intrinsic) magnetic field. In a known alternative recording method, the external magnetic field is time-modulated.

It is known that the magnetooptical recording layers which consist of amorphous ferrimagnetic (RE-TM) alloys, are magnetized at right angles to their surface and may have a plurality of layers are heated at the point of contact during recording of data by the write laser beam. As a result of the heating, the coercive force $H_c$ of the alloys decreases. If the coercive force $H_c$ falls below the sum of the field strengths of the applied (external) auxiliary magnetic field and of the intrinsic field at a critical temperature dependent on the particular alloy used, a region which has a direction of magnetization opposite to the original direction is formed at the point of contact. Such a region is also referred to as a magnetic domain.

The diameter and the shape of the domains formed depend both on the size of the laser spot, the laser power, the laser pulse time and the strength of the external magnetic field and on the magnetization $M_s$ and the coercive force $H_c$ of the recording layer. Round smooth-edged domains are desirable since they give a high signal and a high signal-to-noise ratio during reading.

In the write process, smooth-edged domains are obtained in particular when the magnetization and the coercive force of the magnetooptical storage layer have a suitable temperature dependence and the Curie temperature $T_c$ of the storage layer is at least approximately reached during heating by the laser beam.

At temperatures substantially above $T_c$, large, overlapping domains having poor signal-to-noise ratios are obtained. On the other hand, at temperatures substantially below $T_c$, the nucleation of domains having the opposite magnetization is possible only with very high external magnetic fields which are therefore unsuitable for use.

It is known that, during recording of the data, the write laser beam is moved relative to the magnetooptical computer disk or its magnetooptical recording layer and above the surface of said disk or layer. In general, the laser beam is focused on the recording layer by a displaceable optical apparatus, and the relevant magnetooptical computer disk is rotated at constant angular velocity (CAV).

It is known that the data recorded in the magnetooptical computer disks can, if required, be deleted by controlled local heating of their magnetooptical recording layer, for example by means of an unmodulated continuous laser beam with the simultaneous action of an external or an intrinsic magnetic field whose field lines are oriented at right angles to the surface of the recording layer, after which further data can be recorded, i.e. the write process is reversible.

The data are usually read using the linearly polarized light of a continuous-wave laser whose power is not sufficient to heat the material above the critical temperature. This laser beam is reflected either by the recording layer itself or by a reflector layer arranged behind it, the result being an interaction between the magnetic moments in the recording layer and the electromagnetic field of the laser light. Because of this interaction, the plane of polarization of the reflected laser light is rotated through a small angle relative to the original plane. If this rotation of the plane of polarization occurs when the light is reflected by the recording layer itself, the term Kerr effect is used and the angle of rotation is accordingly referred to as the Kerr angle; if, on the other hand, the plane is rotated during passage of the light twice or a greater number of times through the recording layer, the terms Faraday effect and Faraday angle are used. The direction of rotation of the plane of polarization depends on the magnetization direction at the relevant point of the storage layer. This rotation of the plane of polarization of the laser light reflected by the magnetooptical computer disk can be measured with the aid of suitable optical and electronic apparatuses and converted into signals, as described in, for example, U.S. Pat. No. 4 466 035. The magnetooptical read signal is proportional to the product of the Kerr angle and the reflectivity of the magnetooptical layer system. A high Kerr angle accordingly results in a high read signal and a correspondingly improved signal-to-noise ratio.

For the laser wavelengths currently used (from 780 nm to 830 nm), the Kerr angle of the stated (RE-TM) alloys is, as a rule, from 0.2° to 0.3°. The Kerr angle of alloys based on the heavy RE elements Gd, Tb and Dy generally decreases with decreasing wavelength. Since it is expected that short-wavelength lasers will be used for future magnetooptical computer disks, the stated (RE-TM) alloys have the disadvantage of a reduced magnetooptical read signal.

As described in the stated U.S. Pat. No. 4,466,035, the Kerr angle can be increased by using suitable dielectric layers on the front and back of the magnetooptical recording layer and by employing a metallic reflector on the back of the magnetooptical recording layer. When the Kerr angle is increased with the aid of dielectric layers, a decrease in the reflectivity must, as a rule, be accepted. Since a minimum reflectivity is required for operating a magnetooptical storage medium in a prior art drive, the increase in the magnetooptical read signal in the manner described is subject to limits. In particular, the stated disadvantageous reduction of the Kerr angle with decreasing wavelengths of the recording laser cannot be avoided by optical matching with dielectric layers.

It is known that the Kerr angle of an amorphous (RE-TM) layer can be increased by alloying with Pt. At the same time, however, considerable reduction in the coercive force in the direction at right angles to the film surface is observed. In the known magnetooptical recording layers, the advantage of the increased Kerr angle can therefore often be utilized to a limited extent since the Pt concentration must be kept low because of the coercive force Another great disadvantage of the stated (RE-TM) alloys is their poor corrosion resistance. Direct contact of the layers with air or water vapor results in progressive oxidation of the magnetooptical layer over a large area, said oxidation initially causing a reduction in the Kerr angle and in the reflectivity and hence a decrease in the signal-to-noise ratio and finally leading to completely oxidized layers which are useless for magnetooptical purposes.

A possible method for improving the corrosion resistance of magnetooptical computer disks based on (RE-TM) alloys is the application of a transparent protective layer on the front and back for avoiding direct contact of the recording layer with air and for inhibiting the entry of oxygen or water molecules by diffusion. This is possible only by means of very dense, crack-free and pore-free layers, for example of $Si_3N_4$ or AlN. However, the additional deposition of the transparent protective layers before and after application of the recording layer makes the production process for magnetooptical computer disks substantially longer and more expensive. Furthermore, defects in the protective layer, for example pinholes or cracks, can lead to corrosion of the lower-lying magnetooptical recording layer. An expensive quality control of the deposited protective layers is therefore necessary in order to ensure their protective effect.

Owing to the high sensitivity of (RE-TM) alloys to oxidation, reactions of said alloys with reactive gases in the residual gas may also occur in the coating chamber. Particularly during the period after application of an (RE-TM)-containing layer and before application of the subsequent layer (for example, due to the changing of the sputtering target or transport of the coated disk), a superficial oxide layer may form as a result of reaction with the $O_2$ or $H_2O$ molecules of the residual gas.

In the known exchange-coupled double layer systems described further below, there is a weakening of the exchange interaction at room temperature between the reproducing layer and the storage layer owing to nonmagnetic intermediate layers which form after production of the first magnetic layer and before application of the second magnetic layer by a reaction of the (RE-TM) alloy with reactive gases in the residual gas of the coating unit. This exchange interaction is even decisively reduced by monolayers of a nonmagnetic intermediate layer, for example of a metal oxide. Although the superficial oxide layer can be substantially removed by etching processes, for example a plasma etching process in an Ar atmosphere, the production process for the magnetooptical computer disk is however made longer and more expensive as a result.

An alternative method for improving the corrosion behavior of amorphous (RE-TM) alloys is the alloy of corrosion inhibitors, i.e. elements which delay the corrosion of the recording layer. A number of (RE-TM) alloys with homogeneously alloyed corrosion inhibitors are known.

For example, EP-A 229 292 describes a magnetooptical recording medium which consists of a (RE-TM) alloy containing an additional element, for example Ti, Cr, Al, Pt, Zr, V, Ta, Mo, W, Cu, Ru, Rh, Pd, Nb, Ir or Hf. The addition of said element delays the decrease in the coercive force and in the Kerr angle during storage of the magnetooptical layer in direct contact with humid air.

U.S. Pat. No. 4,693,943 describes a magneto-optical recording medium having an amorphous (RE-TM) alloy with the composition $[(dTb)_{1-y}(FeCo)_y]_{1-p}Cr_p$, where $0.5 \leq y \leq 0.9$ and $0.001 \leq p \leq 0.3$. The addition of Cr substantially improves the corrosion stability of the magnetooptical recording medium. We have found that the corrosion stability increases monotonically with increasing Cr content.

It is also known that the corrosion stability of (RE-TM) layers can be further improved by simultaneously alloying a plurality of elements with said layers. EP-A 302 393 describes a magnetooptical recording medium containing a (RE-TM) alloy with which from 1 to 10 atom % of one or more elements from the group consisting of Nb, Ti, Ta, Cr and Al and from 2 to 10 atom % of one or more elements from the group consisting of Pt, Au, Pd and Rh are also alloyed.

A substantial disadvantage of the use of corrosion inhibitors is that the magnetic and magnetooptical properties of the recording medium are as a rule adversely affected by alloying with a corrosion inhibitor. In many cases, the Kerr angle is reduced and the temperature dependence of the magnetization and of the coercive force are unfavorably changed, having adverse effects on the write and read behavior of the recording medium.

Exchange-coupled double layer systems which contain a first magnetic layer having a low coercive force and a second magnetic layer having a high coercive force are described in, for example, EP-A 51 296, U.S. Pat. No. 4,628,485, U.S. Pat. No. 4,753,853, EP-A 305 185, EP-A 330 394 and EP-A 333 467.

EP-A 51 296 describes a thermomagnetic recording medium having a first and a second magnetically anisotropic layer, the second magnetic layer having a higher coercive force and a lower Curie temperature than the first magnetic layer. The first magnetic layer essentially contains a Gd alloy U.S. Pat. No. 4,628,485 describes a magnetooptical recording medium having a first thin magnetic layer of low Curie temperature and high coercive force (recording layer), an adjacent second magnetic layer (reproducing layer) having a high Kerr angle and further dielectric and metallic layers for optically increasing the Kerr angle.

U.S. Pat. No. 4,645,722 describes a magnetooptical recording medium having a first magnetic layer which possesses a high coercive force and a second, multistratum magnetic layer system which has a higher Kerr angle and/or a higher reflectivity than the first magnetic layer.

U.S. Pat. No. 4,753,853 describes an exchange-coupled magnetooptical double layer system in which a first layer has a lower Curie temperature and a high coercive force and consists of a TM-rich (Gd-Fe-Co) alloy. The second layer has a high Curie temperature and a low coercive force and consists of a TM-rich (Tb-Fe) alloy.

EP-A 330 394 discloses a magneto-optical recording medium of the double layer type whose magnetic layer having a low coercive force and high Curie temperature contains Gd and one or more of the two elements Tb and Dy. The coercive force of the two magnetic layers and the ratio of the domain wall energy between these two layers to the product of saturation magnetization and thickness of the layer having a low coercive force must satisfy specific conditions.

The magnetic layer having a low coercive force may be doped with one or more elements from the group consisting of Ni, Cr, Ti, Al, Si, Pt, In and Cu. However, no data at all is given with regard to the concentration of these elements Moreover, EP-A 330 394 does not disclose the purpose for which the layer having a low coercive force is to be doped with these elements.

EP-A 364 212 describes a magnetooptical recording medium having a first magnetic layer (reproducing layer) of an amorphous $R_1$-Fe-Co-Cr alloy, where $R_1$ is one or more elements from the group consisting of Tb and Dy, and a second magnetic layer (recording layer) of an amorphous $R_2$-Fe-Co-Cr alloy, where $R_2$ is one or more elements from the group consisting of Tb, Dy and Gd. The proportion of Co in the first magnetic layer is smaller than the proportion of Co in the second magnetic layer.

EP-A 364 196 describes a magnetooptical recording medium which is very similar to that in EP-A 364 212, except that the proportion of Cr in the first magnetic layer is greater than the proportion of Cr in the second magnetic layer.

SUMMARY OF THE INVENTION

It is an object of the present invention to provide a magnetooptical computer disk having a high read signal, in particular at short wavelengths, high data stability and good corrosion stability.

We have found that this object is achieved, surprisingly, by magnetooptical computer disks having one or more optically transparent dimensionally stable substrates and one or more double layer systems consisting of two exchange-coupled magnetic layers which consist of alloys of rare earth metals with transition metals and have vertical magnetic anisotropy, wherein the first magnetic layer adjacent to the substrate has a composition corresponding to the formula I $$RE_xTM_{100-x-y-a}Pt_yA_a \qquad \text{I}$$

and the second magnetic layer, which is arranged on that side of the first magnetic layer which faces away from the substrate, has a composition corresponding to the formula II $$RE_uTM_{100-u-b}B_b \qquad \text{II.}$$

RE is one or more elements from the group consisting of Gd, Tb, Dy and Ho,

TM is one or more elements from the group consisting of Fe and Co,

A and B independently of one another are one or more elements from the group consisting of Cr, Nb, Ta, Al, Si, Ni and Mo, and $5 \leq x \leq 30$, $0.5 \leq y \leq 20$, $15 \leq u \leq 30$, $0 \leq a \leq 25$ and $0.5 \leq b \leq 25$.

The component, essential according to the invention, of the novel magnetooptical computer disk is the novel double layer system having two magnetic layers, of which the first layer (also referred to below as reproducing layer) is platinum and at least the second magnetic layer (also referred to below as storage layer) contains one or more elements from the group consisting of Cr, Nb, Ta, Al, Si, Ni and Mo.

In prior art magnetooptical single layers, the Pt concentration must be kept low and hence no decisive increase in the Kerr angle and in the magnetooptical read signal is achieved.

In the novel magnetooptical computer disks, the decrease in coercive force due to the addition of Pt to the reproducing layer is compensated by the use of an exchange-coupled storage layer having a high coercive force and vertical magnetic anisotropy.

Since this permits substantially higher Pt concentrations to be established in the reproducing layer, it is possible, in contrast to known magnetooptical computer disks, to achieve substantially improved magnetooptical read signals and a considerably improved data stability. This applies in particular when using laser light wavelengths lower than 800 nm.

The Pt concentration and the thickness of the reproducing layer are determined by the following factors. As the Pt concentration increases, the vertical anisotropy of the reproducing layer and hence the exchange interaction of the two layers are reduced. The thickness of the reproducing layer should exceed the depth of penetration of the laser light used, in order to ensure an optimum increase in the Kerr angle. With a reduced exchange interaction, an interruption in the exchange coupling, i.e. separate switching of storage layer and reproducing layer, can occur even at reproducing layer thicknesses which are less than the depth of penetration of the laser light Because of the complicated hysteresis behavior, this case should be avoided in practice.

The Pt concentration to be established in the reproducing layer also depends on the type and concentration of the RE and TM components stated in the formulae I and II and of the one or more elements of the group consisting of Cr, Nb, Ta, Al, Si, Ni and Mo.

DESCRIPTION OF THE PREFERRED EMBODIMENTS

Preferred novel recording media contain platinum and chromium in the reproducing layer and chromium in the storage layer In this preferred embodiment of the novel magnetooptical computer disks, it is particularly advantageous that the properties of Pt or of other elements from the group consisting of Cr, Nb, Ta, Al, Si, Ni and Mo can be combined in a suitable manner. This is useful in particular where there are undesirable side effects with the addition of individual elements.

For example, it is known that, in magnetooptical recording layers of (RE/TM) alloys, the Kerr angle can be increased by adding Pt and reduced by adding Cr. With the simultaneous presence of Cr and Pt in the (RE-TM) alloy of the reproducing layer of the novel magnetooptical computer disks, it is therefore possible, by adding Pt, to compensate the reduction in the Kerr angle due to the Cr content and hence to obtain a high read signal in conjunction with good corrosion stability.

We have also found that the corrosion stability of (RE-TM) alloys achieved with Cr can be substantially improved for Cr contents up to 10 atom % by adding Pt.

We have furthermore found that the Curie temperature $T_c$ of (RE-TM)-containing magnetooptical layers is increased by Pt and reduced by Cr (cf. Table 1). Table 1 shows the Curie temperature $T_c$ and the coercive force $H_c$ as a function of the content of D for magnetooptical layers of $(Tb_{24}Fe_{68}Co_8)_{100-x}D_x$, where D is Pt or Cr.

TABLE 1

| X | $T_c$ (°C.) D = Pt | D = Cr | $H_c$ (kA/m) D = Pt |
|---|---|---|---|
| 0 | 205 | 205 | — |
| 5 | 220 | 165 | 1015 |
| 7 | 225 | 150 | 570 |
| 9 | 231 | 128 | 305 |
| 10 | 235 | 118 | 215 |
| 12 | 248 | 100 | 90 |
| 15 | 266 | 60 | 20 |
| 18 | 302 | 18 | 0 |

As is evident from Table 1, with the knowledge of the quantitative effects of Cr and/or Pt on the Curie temperature or the coercive force, it is possible to find compositions which have an optimum property profile.

It should be borne in mind that $T_c$ and $H_c$ are also dependent on the type and amount of the RE and TM components stated in formulae I and II.

Additional variations of $T_c$ and $H_c$ arise through the exchange coupling of the two magnetic layers in the double layer systems.

In the novel double layer system, the reproducing layer contains Pt and at least the storage layer contains one or more additional elements from the group consisting of Cr, Nb, Ta, Al, Si, Ni and Mo.

By the addition of one or more of these elements, intrinsic corrosion inhibition of the reproducing layer is achieved and hence the formation of nonmagnetic intermediate layers is substantially restricted. While the corrosion-inhibiting elements from the group consisting of Cr, Nb, Ta, Al, Si, Ni and Mo prevent oxidation of the (RE-TM) layer over a large area, the addition of Pt results in substantially increased stability to local corrosion phenomena (e.g. pitting) The double layer system therefore has an excellent life. In a particularly preferred embodiment of the invention, both the reproducing layer and the storage layer therefore contain one or more elements from the group consisting of Cr, Nb, Ta, Al, Si, Ni and Mo. Due to the inhibition of corrosion, a higher exchange coupling between the storage layer and the reproducing layer is achieved, in particular with low vertical orientation of the reproducing layer. The Pt concentration can thus be substantially increased without there being any adverse effects on the coercive force of the double layer system. With the simultaneous use of an element which increases the Kerr angle and of a corrosion-inhibiting element in the reproducing layer, there is thus a synergistic effect with regard to both the Kerr angle and the corrosion stability.

Novel computer disks which contain platinum in the reproducing layer and chromium in the storage layer are also preferred because of the corrosion protection effect. Particularly preferred computer disks are those which contain platinum and chromium in the reproducing layer.

The Pt in the reproducing layer and the one or more elements from the group consisting of Cr, Nb, Ta, Ta, Al, Si, Ni and Mo in the storage layer and possibly in the reproducing layer are uniformly or nonuniformly distributed in the vertical direction, i.e. across the layer thickness and in the horizontal direction, i.e. in the plane of the layer.

It is advantageous if the distribution of one or more elements from the group consisting of Cr, Nb, Ta, Al, Si, Ni and Mo varies in the horizontal direction, i.e. if the concentration of these elements changes continuously or discontinuously in the plane of the layer. In a particularly preferred embodiment, the Cr concentration in the chromium-containing layer or layers increases continuously or discontinuously from the inner edge to its or their outer edge.

The amorphous (RE-TM) alloys of the reproducing layer and of the storage layer may contain, in a known manner, one or more elements from the group consisting of Gd, Tb, Dy and Ho as RE elements and one or more elements from the group consisting of Fe and Co as TM elements. The ferrimagnetic coupling between these stated RE and TM atoms leads to a high coercive force in a direction at right angles to the plane of the layer. Consequently, a maximum Kerr angle on exposure of the medium at right angles to the surface and high data security are ensured. However, the magnitude of the vertical anisotropy and hence the maximum value of the coercive force in a direction at right angles to the plane of the layer differ in the two layers. Known compounds having a high coercive force are Tb- and/or Dy-containing alloys, for example Tb-Fe, Tb-Fe-Co, Dy-Fe or Dy-Fe-Co, but the lastmentioned alloys have only a relatively small Kerr angle. Alloys such as Gd-Co, Gd-Fe and Gd-Fe-Co are also known, said alloys having a high Kerr angle but a reduced coercive force at right angles to the plane of the layer.

Known exchange-coupled layer systems therefore use an alloy based on Gd-Co, Gd-Fe or Gd-Fe-Co as the reproducing layer and an alloy based on Tb-Fe, Tb-Fe-Co, Dy-Fe or Dy-Fe-Co as the storage layer, the greater Kerr angle of the reproducing layer leading to a high magnetooptical read signal and the higher coercive force of the storage layer resulting in improved stability of the magnetically reversed region and hence of the stored information.

Finally, the Curie temperature of the reproducing layer can be increased in a known manner above the Curie temperature of the storage layer by increasing the proportion of Co, resulting in a further increase in the magnetooptical read signal. While in a single-layer storage medium the increase in the Curie temperature is accompanied by a reduction in the sensitivity, the increase in the Curie temperature of the reproducing layer in an exchange-coupled double layer medium is not associated with a loss of sensitivity if the exchange coupling of the two layers is high at room temperature but small in the region of the Curie temperature of the storage layer. If the last-mentioned condition is not fulfilled, a change in the direction of magnetization of the storage layer with continuing low recording powers is not possible when the Curie temperature of the reproducing layer is too high, and the magnetooptical storage medium thus cannot be recorded on at small laser recording powers.

In order to achieve an improved temperature dependence of the exchange coupling, the novel double layer systems may possess, between the two magnetic layers, one or more further magnetic intermediate layers which have a Curie temperature which is lower than the Curie temperature of the storage layer but higher than room temperature. Examples of these further magnetic layers are described in EP-A 258 978.

The stated intermediate layer promotes a high exchange coupling between the reproducing layer and the storage layer at room temperature. However, in the region of the recording temperature, i.e. the Curie temperature of the storage layer, the exchange coupling between the storage layer and the reproducing layer is greatly reduced owing to the lack of long-range magnetic order in the intermediate layer. This permits magnetic reversal of the storage layer despite the existing orientation of the reproducing layer. On cooling, the sublattice magnetization of the storage layer increases more rapidly than the exchange coupling between the storage layer and the reproducing layer. At a critical temperature, the reproducing layer is therefore oriented according to the orientation of the storage layer, while the undesirable reversed process, i.e. orientation of the storage layer according to the orientation of the reproducing layer, is prevented.

The reproducing layer and storage layer of the novel computer disks have a thickness in the conventional range. In general, this range is from 10 to 500 nm. The thickness of the reproducing layer is preferably from 20 to 40 mm and that of the storage layer is preferably from 40 to 60 mm.

The novel magnetooptical double layer is produced during the production of the novel magnetooptical computer disk.

The novel magnetooptical computer disk contains the optically transparent dimensionally stable substrate as a further essential component in addition to the novel magnetooptical double layer.

Examples of advantageous dimensionally stable substrates are the conventional, disk-shaped, optically transparent, dimensionally stable substrates. In general, these consist of optically transparent ceramic materials or of plastics. Usually, they have a diameter of from 50 to 200 mm, advantageously from 80 to 150 mm, in particular from 90 to 130 mm. In general, they are from 0.5 to 1.5 mm, preferably from 0.8 to 1.3 mm, thick.

An example of a suitable optically transparent dimensionally stable ceramic material is glass. Examples of suitable optically transparent dimensionally stable plastics are polycarbonate, polymethyl methacrylate, polymethylpentene, cellulose acetobutyrate, mixtures of polyvinylidene chloride and polymethyl methacrylate and mixtures of polystyrene and poly-(2,6-dimethylphen-1,4-ylene ether). Among these, the dimensionally stable substrates consisting of plastics are particularly advantageous.

That surface of the dimensionally stable substrate which faces the novel magneto-optical double layer may have structures.

The structures in the surface of said substrate are in the micrometer and/or submicrometer range. They are used for exact guidance of the read laser beam and ensure a rapid and precise response of the tracking and autofocusing means in the laser-optical write and read heads of the disk drives, i.e. they permit or improve the tracking. Moreover, these structures may themselves be data, as is the case, for example, in the known audio or video compact disks, or they may be used for coding the recorded data. The structures consist of raised parts and/or indentations. These are in the form of continuous concentric or spiral tracks or isolated hills and/or holes. Moreover, the structure may have a more or less smooth wave shape. The tracks are preferred. In their cross-section, these have a rectangular, sawtooth-like, V-shaped or trapezoidal contour. Their indentations are generally referred to as grooves and their raised parts as land. Tracks having from 50 to 200 nm deep and from 0.4 to 1.0 $\mu$m wide grooves separated in each case by a 1-3 $\mu$m wide land are particularly advantageous.

The particularly preferably used dimensionally stable substrate is produced in a conventional manner by shaping the plastic or plastic blend forming the substrate by the injection molding method, if necessary under clean room conditions, as described in, for example, DE-A-37 27 093.

The novel magnetooptical computer disk may contain one or more further layers in addition to the dimensionally stable substrate and the novel magnetooptical double layer.

The arrangement of the various layers depends on whether, during recording or reading, the magnetooptical storage layer is exposed to laser light from the substrate side or the air side. Exposure from the substrate side is preferred.

In the latter case, a conventional antireflection layer of an optically transparent dielectric material having a high refractive index may be present between the dimensionally stable substrate and the novel magnetooptical double layer system. The refractive index is greater than that of the substrate but smaller than that of the reproducing layer. This material usually contains oxides and/or nitrides or consists of these compounds.

Furthermore, a further optically transparent dielectric layer containing or consisting of oxides, carbides and/or nitrides may be present on that side of the novel magnetooptical double layer system which faces away from the substrate.

In addition, a conventional reflector layer, which usually consists of metals, may be present on that side of the novel magnetooptical recording layer which faces away from the dimensionally stable substrate, either directly thereon or on a transparent layer of oxides, carbides and/or nitrides is arranged thereon.

Moreover, the novel magnetooptical computer disk may have a conventional dielectric protective or anticorrosion layer on that side of the reflector layer which faces away from the novel magnetooptical recording layer, and/or on one or more sides of the novel magnetooptical double layer system, said protective or anticorrosion layer likewise containing or consisting of carbides, oxides and/or nitrides.

The additional layers (reflector layer or protective/anticorrosion layers) may also consist of a plurality of several strata. These layers may be X-ray amorphous or polycrystalline.

The thickness of these additional layers is in general known and is described in, for example, the prior art cited at the outset.

However, it is also possible to expose the magnetooptical recording layer from the air side, directly or through any transparent antireflection and/or protective layers present. In this case, the antireflection layer is arranged on that side of the magnetooptical double layer system which faces away from the substrate. Accordingly, the reflector layer is present between the substrate and the magnetooptical recording layer.

Further examples of suitable possibilities for arranging the various layers in the novel magnetooptical computer disk are disclosed in U.S. Pat. No. 4,710,418.

The arrangement of the two magnetic layers of the novel double layer system is chosen in each case in such a way that the reproducing layer is arranged between the laser light source and the storage layer.

The reflector layer, the anticorrosion layer and the further layers are produced during production of the novel magnetooptical computer disk, the order of the individual production or process steps depending on the particular composition of said disk.

Two of the novel magnetooptical computer disks described above may furthermore be combined with one another in the form of a sandwich, in such a way that their recording layers face one another and there is a certain distance between them. The conventional techniques for joining two magnetooptical computer disks, as disclosed in, for example, U.S. Pat. No. 4,751,124 or DE-A-37 18 302, are used for this purpose.

The production of the novel magnetooptical computer disk starts from the dimensionally stable substrate described above, on one surface of which the novel magnetooptical double layer of the desired thickness and having the composition required according to the invention and, if required, the further dielectric and/or metal layers are applied in the required order, number and thickness and with the particular composition required, after which a defined magnetization oriented at right angles to the surface of the novel magnetooptical double layer is induced in a conventional manner in said double layer.

The two magnetic layers of the novel magnetooptical double layer and any further layers present are applied by the conventional methods for the production of thin layers by vapor deposition, reactive vapor deposition, ion plating, ion cluster beam deposition (ICB), sputtering, reactive sputtering, magnetron sputtering or reactive magnetron sputtering, the sputtering methods being preferably used.

In sputtering, the corresponding metals, carbides, oxides, nitrides and/or the other compounds which may be used are sputtered in the desired order and amount from a sputtering target placed on the cathode, under reduced pressure in a process gas atmosphere and are deposited on the dimensionally stable substrate or on a layer already present thereon. Usually, the process gas contains a noble gas, such as argon.

In reactive sputtering, further reactive gases, such as hydrogen, hydrocarbons, oxygen, nitrogen, etc., in the desired amount, are mixed with the process gas at a suitable time. Thus, by sputtering a metal, for example, in the presence of hydrocarbons, oxygen and/or nitrogen in the process gas, it is possible directly to deposit the relevant metal oxide, nitride, carbide, carbide/oxide, carbide/nitride, oxide/nitride or carbide/oxide/nitride layers. The thickness, the structure and the composition of the relevant layers can be adjusted in a conventional manner via the sputtering rate, the deposition rate, the process gas pressure and the process gas composition.

In reactive magnetron sputtering, the target is known to be present in a magnetic field.

Examples of suitable sputtering processes are disclosed in U.S. Pat. No. 4,670,353, U.S. Pat. No. 4,670,316 or DE-A-37 35385.

The two magnetic layers of the novel magneto-optical double layer of the computer disk according to the invention can be produced, for example, by sputtering or magnetron sputtering of two (RE-TM) alloys of suitable external shape, in the form of a sputtering target, at separate times, under reduced pressure in a process gas atmosphere, and by depositing the lanthanide/-transition metal alloys from the gas phase onto the surface of the dimensionally stable substrate or onto a layer already present thereon, according to the invention a platinum-containing (RE-TM) alloy being used for depositing the first magnetic layer. In addition, one or both of the two (RE-TM) alloys contain one or more elements from the group consisting of Cr, Nb, Ta, Al, Si, Ni and Mo.

In the sputtering targets, the concentration of platinum and, where relevant, of Cr, Nb, Ta, Al, Si, Ni and Mo may be spatially constant or may change as a function of the radius or in the horizontal direction. This change in the concentrations may be continuous or discontinuous.

Data in the form of magnetically reversed spots can be recorded on the novel magnetooptical computer disks in a conventional manner from the side of the optically transparent dimensionally stable substrate with the aid of a pulse-modulated write laser beam which is focused on the novel magnetooptical double layers, strikes them at right angles and has a wavelength $\lambda$ of less than 1,000 nm. Thereafter, the data can be read with the aid of a continuous-wave laser beam focused on said double layers and striking them at right angles, the light reflected by the reproducing layers themselves or by reflector layers being measured, analyzed and converted into signals. In the case of the novel magnetooptical computer disks, the conventional laser-optical disk drives having laser-optical heads which contain semiconductor lasers can be used for this purpose.

The novel magnetooptical computer disks have particular advantages.

The novel computer disks have substantially improved magnetooptical read signals and considerably improved data stability.

In addition, the novel magnetooptical double layers can be adapted in an excellent but simple manner to the property profile of the other layers which may be present in the novel magnetooptical computer disks, resulting in possibilities for optimizing magnetooptical computer disks which were unknown to date and/or previously thought to be impossible to realize.

The novel magnetooptical computer disks have high corrosion stability. Compared with the known magnetooptical computer disks, there is also good corrosion protection at the points particularly at risk.

EXAMPLES 1 TO 5

The composition of the magnetic layers was chemically analyzed in each case by ICP (induced coupled plasma) spectroscopy. The Kerr angle was measured using an He-Ne laser of wavelength 633 nm, from the air side, at right angles to the plane of the layer, as a function of a variable external magnetic field. The deposited magnetic layers have an axis of easy magnetization in a direction at right angles to the surface of the thin layer.

To investigate the corrosion stability, the layers were stored in a conditioning cabinet at a constant temperature and humidity (80° C, 80% relative humidity). The measurement of the Kerr angle was repeated at certain time intervals. It was found that the residual Kerr angle decreases with increasing storage time. The decrease depends on the chemical composition of the magnetic layer and can be characterized by the parameter $t_{0.5}$, which is the time after which the residual Kerr angle has decreased to 50% of its initial value.

EXAMPLE 1

A target consisting of Tb, Fe, Co and Pt was used in a d.c. voltage sputtering unit. A glass sheet (diameter 130 mm) was arranged parallel to the target, at a distance of 65 mm. The vacuum chamber of the sputtering unit was evacuated to a reduced pressure of $1 \times 10^{-7}$ mbar. Thereafter, Ar gas was introduced to a pressure of $6 \times 10^{-3}$ mbar. By applying a d.c. voltage at a sputtering power of 500 W, a thin layer having a thickness of 80 nm and the composition $(Tb_{21}Fe_{58}Co_{21})_{91}Pt_9$ was deposited.

It was found experimentally that the residual Kerr angle of the $(Tb_{21}Fe_{58}Co_{21})_{91}Pt_9$ layer is 20% greater than the residual Kerr angle of a comparative layer without Pt. It was also found that the coercive force of the layer is less than 100 kA/m and the layer is therefore unsuitable for magnetooptical data storage. The $t_{0.5}$ value of the layer was determined as 40 h.

EXAMPLE 2

A target consisting of Tb, Fe, Co, Cr and Pt was used in a d.c. voltage sputtering unit. A glass sheet (diameter 130 mm) was arranged parallel to the target, at a distance of 65 mm. The vacuum chamber of the sputtering unit was evacuated to a reduced pressure of $1 \times 10^{-7}$ mbar. Thereafter, Ar gas was introduced to a pressure of $6 \times 10^{-3}$ mbar. By applying a d.c. voltage at a sputtering power of 500 W, a thin layer having a thickness of 80 nm and the composition $(Tb_{21}Fe_{58}Co_{21})_{87}Pt_9Cr_4$ was deposited.

It was found that the residual Kerr angle of the layer is 20% greater than the residual Kerr angle of a comparative layer without Pt. It was also found that the coercive force of the layer is less than 100 kA/m, and the layer is therefore unsuitable for magnetooptical data storage. The $t_{0.5}$ value of the layer was determined as 700 h. The corrosion stability of the deposited layer is thus substantially increased compared to with the layer from Example 1.

EXAMPLE 3

A first target, consisting of Tb, Fe, Co, Cr and Pt, and a second target, consisting of Tb, Fe, Co and Cr, were used in a d.c. voltage sputtering unit. A glass sheet (diameter 130 mm) was arranged parallel to the targets, at a distance of 65 mm. The vacuum chamber of the sputtering unit was evacuated to a reduced pressure of $1 \times 10^{-7}$ mbar. Thereafter, Ar gas was introduced to a pressure of $6 \times 10^{-3}$ mbar. By applying a d.c. voltage at a sputtering power of 500 W to the first target, a thin layer having a thickness of 30 nm and the composition $(Tb_{21}Fe_{58}Co_{21})_{87}Pt_9Cr_4$ was initially deposited. By applying a d.c. voltage at a sputtering power of 500 W to the second target, a thin layer having a thickness of 50 nm and the composition $Tb_{20}Fe_{48}Co_{22}Cr_{10}$ was then deposited.

The Kerr angle of the double layer was measured from the substrate side as a function of a variable external magnetic field, at right angles to the plane of the layer. The residual Kerr angle measured was 20% greater than the Kerr angle of a comparative layer without Pt. It was also found that the coercive force of the layer system is greater than 200 kA/m. The layer system is thus suitable for magnetooptical data storage.

In the investigation of the corrosion stability, the measurement of the Kerr angle was repeated from the air side and substrate side at certain time intervals. It was found that the $t_{0.5}$ value of the stated layer exceeds 700 h. The novel layer system thus has better corrosion stability than the layer from Example 2.

EXAMPLE 4

A first target consisting of Tb, Fe, Co and Pt, and a second target, consisting of Tb, Fe, Co and Cr, were used in a d.c. voltage sputtering unit. Six glass sheets (diameter 130 mm) were each arranged parallel to the targets, at a distance of 65 mm. The vacuum chamber of the sputtering unit was evacuated to a reduced pressure of $1 \times 10^{-7}$ mbar. Thereafter, Ar gas was introduced to a pressure of $6 \times 10^{-3}$ mbar. By applying a d.c. voltage at a sputtering power of 500 W to the first target, a layer having the composition $(Tb_{21}Fe_{58}Co_{21})_{96}Pt_4$ was deposited on each of the six glass sheets. The layer thicknesses were 10, 20, 30, 40, 50 and 60 nm. By applying a d.c. voltage at a sputtering power of 500 W to the second target, a thin layer having a thickness of 50 mm and the composition $Tb_{20}Fe_{48}Co_{22}Cr_{10}$ was then deposited.

EXAMPLE 5

The production of a total of six double layer systems, each on a glass sheet, was carried out as in Example 4, except that the reproducing layer had the composition $(Tb_{21}Fe_{58}Co_{21})_{91}Pt_9$.

The data measured on the double layer systems of Examples 4 and 5 are shown in Table 2. In this Table, $H_c$ is the coercive force, $\theta_k/\theta_k(0)$ is the increase in the Kerr angle of the double layer system compared with the Kerr angle of a single-layer system having the composition of the storage layer, and d is the thickness of the reproducing layer.

TABLE 2

| | $H_c$ [kA/m] | | $\theta_k/\theta_k(0)$ | |
|---|---|---|---|---|
| d [nm] | Example 4 | Example 5 | Example 4 | Example 5 |
| 0 | 780 | 780 | 1.0 | 1.0 |
| 10 | 570 | 380 | 1.25 | 1.25 |
| 20 | 430 | 215 | 1.56 | 1.58 |
| 30 | 420 | 205 | 1.76 | 1.76 |
| 40 | 402 | 165 | 1.73 | 1.82 |
| 50 | 370 | 132 | 1.72 | 1.80 |
| 60 | 360 | 123 | 1.63 | 1.76 |

When Examples 4 and 5 (cf. Table 2) are compared by way of example, it is found that the desired property profile can be established via the composition of the reproducing layer and storage layer and their thicknesses.

We claim:

1. A magnetooptical computer disk having one or more optically transparent dimensionally stable substrates and one or more double layer systems consisting of two exchange-coupled magnetic layers which consist of alloys of rare earth metals with transition metals and have vertical magnetic anisotropy, wherein the first magnetic layer adjacent to the substrate has a thickness of from 20 to 40 nm and a composition corresponding to the formula I $$RE_xTM_{100-x-y-a}Pt_yA_a \qquad I$$

and the second magnetic layer, which is arranged on that side of the first magnetic layer which faces away from the substrate, has a thickness of 40 to 60 nm and a composition corresponding to the formula II $$RE_uTM_{100-u-b}B_b \qquad II$$

where
- Re is one or more elements from the group consisting of Gd, Tb, Dy and Ho,
- TM is one or more elements from the group consisting of Fe and Co,
- A and B independently of one another are one or more elements from the group consisting of Cr, Nb, Ta, Al, Si, Ni and Mo, and $5 \leq x \leq 30$,
$0.5 \leq y \leq 20$,
$15 \leq u \leq 30$,
$0 \leq a \leq 25$ and
$0.5 \leq b \leq 25$.

2. A magnetooptical computer disk as claimed in claim 1, wherein the first magnetic layer adjacent to the substrate has a composition corresponding to formula I, and $0.5 \leq a \leq 25$.

3. A magnetooptical computer disk as claimed in claim 2, wherein the elements A and B are each chromium.

4. A magnetooptical computer disk as claimed in claim 1, wherein the Curie temperature of the first magnetic layer is greater than the Curie temperature of the second magnetic layer 5. A magnetooptical computer disk as claimed in claim 4, wherein one or more further magnetic intermediate layers having a Curie temperature which is greater than room temperature and lower than the Curie temperature of the second magnetic layer are arranged between the first and the second magnetic layers.

6. A magnetooptical computer disk as claimed in claim 1, wherein a dielectric layer consisting of a metal nitride, oxide or carbide or a mixture thereof is arranged on one or more sides of the double layer system.

7. A magnetooptical computer disk as claimed in claim 1, wherein a reflector layer is arranged on that side of the double layer system which faces away from the substrate or on a dielectric layer arranged thereon.

* * * * *